United States Patent
Su

(10) Patent No.: US 6,855,769 B2
(45) Date of Patent: Feb. 15, 2005

(54) THERMOPLASTIC STYRENIC RESIN COMPOSITION

(75) Inventor: Wen-Yi Su, Tainan (TW)

(73) Assignee: Chi Mei Corporation, Tainan (TW)

(*) Notice: Subject to any disclaimer, the term of this patent is extended or adjusted under 35 U.S.C. 154(b) by 0 days.

(21) Appl. No.: 10/702,610

(22) Filed: Nov. 7, 2003

(65) Prior Publication Data

US 2004/0102579 A1 May 27, 2004

Related U.S. Application Data

(62) Division of application No. 10/243,723, filed on Sep. 16, 2002, now Pat. No. 6,759,495.

(51) Int. Cl.$^7$ .............................. C08F 8/00; C08L 27/12; C08L 33/02; C08L 35/00; C08L 39/04
(52) U.S. Cl. ................. 525/191; 525/194; 525/199; 525/205; 525/217; 525/221; 525/222; 525/232; 525/268; 525/241; 264/171.1; 264/171.15; 264/171.24; 264/172.13
(58) Field of Search ................................ 525/191, 194, 525/199, 205, 217, 221, 222, 232, 238, 241; 264/171.1, 171.15, 171.24, 172.13

(56) References Cited

FOREIGN PATENT DOCUMENTS

EP        0 108 461 A1 *  5/1984
GB        2 010 866 A  *  7/1979

* cited by examiner

Primary Examiner—Nathan M. Nutter

(57) ABSTRACT

The present invention relates to a thermoplastic styrenic resin composition comprises a styrenic copolymer comprising 15–100 parts by weight of a unit derived from a styrenic monomer (i-1), 0–45 parts by weight of a unit derived from a vinyl cyanide monomer (i-2), 0–40 parts by weight of a unit derived from a copolymerizable vinyl monomer (i-3) other than the above monomers, and 0.0005–1.0 parts by weight of a unit derived from a polyfunctional maleimide monomer, all based on 100 parts by weight of the total amount of (i-1) to (i-3). The thermoplastic styrenic resin composition manufactured in the present invention is excellent in processability. The rubber modified thermoplastic styrenic resin composition of the present invention gives a good heat stability, impact strength, fluidity and other mechanical properties. In addition, it also gives a uniform wall thickness, and the gloss on the surface of injected products after painting process is excellent. The thermoplastic styrenic resin composition and the rubber modified thermoplastic styrenic resin composition in this invention are applicable for electric and electronic articles and they are especially applicable for the forming and processing of refrigerator plates. So, the thermoplastic styrenic resin composition and the rubber modified thermoplastic styrenic resin composition of the present invention is beneficial to the industry is also commercially valuable.

4 Claims, 1 Drawing Sheet

THERMOPLASTIC STYRENIC RESIN COMPOSITION

This application is a Divisional application of U.S. Ser. No. 10/243,723, filed Sep. 16, 2002, and now U.S. Pat. No. 6,759,495.

BACKGROUND OF THE INVENTION

1. Filed of the Invention

The present invention is related to a thermoplastic styrenic resin composition comprising a specific styrenic copolymer (A). It is further related to a rubber modified thermoplastic styrenic resin composition containing said styrenic copolymer (A) and rubber particle (B). The thermoplastic styrenic resin composition and the rubber modified thermoplastic styrenic resin composition have high fluidity and excellent processability such as vacuum forming.

2. Background of the Invention

It has been known that the thermoplastic styrenic resin are widely used in the manufacture of electric and electronic article as well as automobile parts because of characteristics on processing and mechanical properties, especially the better appearance and gloss.

Usually, the thermoplastic styrenic resin could be processed by such methods as injection, extrusion, blown molding, etc. As regards to the process such as vacuum forming, the styrenic resin should be extruded to form sheet in advance, and it is processed into the required shape by vacuum forming. For improving the vacuum formability, the resin should have high melt tension, namely having high molecular weight, to get better thickness uniformity and dimension stability in vacuum forming. The increased molecular weight will, however, normally decrease the fluidity, processability, and productivity, etc.

The improvement of both vacuum formability and fluidity could be achieved by adding branching agents, as given in Japanese patent publication such as 59-149912, 2-182711 and 8-269137. Generally, the branching agents added are polyfunctional vinyl monomers, such as divinyl compounds (for example divinyl benzene) or polyfunctional acrylic ester. In the case of these monomers applied in the process, the styrenic resin has well-balanced fluidity and processability (ex. Vacuum forming). But the cross linking will be easily occurred and the resin would be adhered to the wall of pipeline and generate contaminations. Furthermore, with the increase of continuous production time, the above-mentioned problems will become even more remarkable.

SUMMARY OF THE INVENTION

The object of the present invention is to provide a novel thermoplastic styrenic resin which is excellent in fluidity and vacuum formability along with excellent appearance of color on processing.

The present invention therefore provides a thermoplastic styrenic resin composition which comprises a styrenic copolymer (A) comprising 15–100 parts by weight of a unit derived from a styrenic monomer (i-1), 0–45 parts by weight of a unit derived from a vinyl cyanide monomer (i-2), 0–40 parts by weight of a unit derived from a copolymerizable vinyl monomer (i-3) other than above monomer, and 0.0005–1.0 parts by weight of a unit derived from a polyfunctional maleimide monomer, all based on 100 parts by weight of the total amount of (i-1) to (i-3)

The present invention further provides a rubber modified thermoplastic styrenic resin composition which comprises of a styrenic copolymer (A) as the continuous phase comprising 15–100 parts by weight of a unit derived from a styrenic monomer (i-1), 0–45 parts by weight of a unit derived from a vinyl cyanide monomer (i-2), 0–40 parts by weight of a unit derived from a copolymerizable vinyl monomer (i-3) other than the above monomers, and 0.0005–1.0 parts by weight of a unit derived from a polyfunctional maleimide monomer, all based on 100 parts by weight of the total amount of (i-1) to (i-3), and rubber particle (B) as the dispersed phase, wherein the rubber content of the rubber modified thermoplastic styrenic resin composition is in the range of 1–40 weight %.

The rubber modified thermoplastic styrenic resin composition thus obtained has excellent heat stability, impact strength, fluidity, thickness uniformity after vacuum forming process, and good uniformity of glass of the injection product after painting.

DETAILED DESCRIPTION OF THE PRESENT INVENTION

Figure 1:
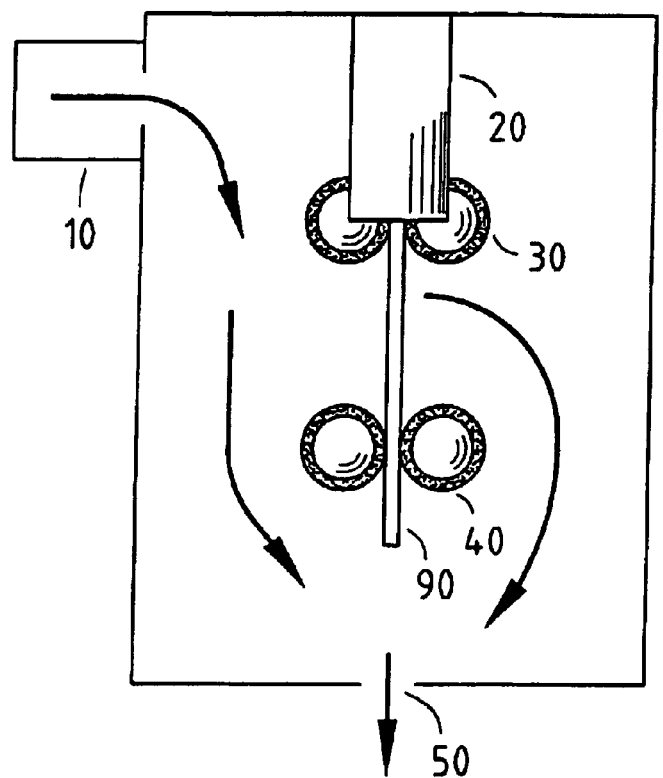
FIG. 1 is a layout of the instrument for maximum extension stress analysis in the present invention.

Examples of styrenic monomer (i-1) used in the present invention are styrene, α-methylstyrene, p-tertiary butylstyrene, p-methylstyrene, o-methylstyrene, m-methylstyrene, 2,4-dimethylstyrene, ethylstyrene, α-methyl-p-methyl styrene or bromostyrene, etc. Among these, styrene or α-methylstyrene is preferred. They may be used either singly or in combination. The amount of styrenic monomer (i-1) used in the present invention is 15–100 parts by weight, preferably 20–95 parts by weight, and most preferably 25–90 parts by weight.

Examples of the vinyl cyanide monomer (i-2) used in the present invention are acrylonitrile, α-methylacrylonitrile, etc. Among these, acrylonitrile is preferred. The amount of vinyl cyanide monomer (i-2) used in the present invention is 0–45 parts by weight, preferably 2–40 parts by weight, most preferably 3–40 parts by weight.

The copolymerizable vinyl monomer (i-3) which is copolymerizable with styrenic monomer (i-1) may be ester of acrylic acid, ester of methacrylic acid and monofunctional maleimide monomer, etc.

Examples of ester of acrylic acid are methyl acrylate, ethyl acrylate, iso-propyl acrylate, butyl acrylate, polyethylene glycol diacrylate, etc. Among these, butyl acrylate is preferred.

Examples of methacrylic acid are methyl methacrylate, ethyl methacrylate, propyl methacrylate, butyl methacrylate, benzyl methacrylate, hexyl methacrylate, cyclohexyl methacrylate, dodecyl methacrylate, 2-hydroxyethyl methacrylate, glycidyl methacrylate, dimethyl aminoethyl methacrylate, ethylene dimethacrylate, neopentyl dimethactylate, etc. Among these, methyl methacrylate or butyl methacrylate is preferred.

Monofunctional maleimide monomer means that the monomer contains only one functional group of maleimide. Examples of monofunctional maleimide monomer are maleimide, N-methyl maleimide, N-iso-propyl maleimide, N-butyl maleimide, N-hexyl maleimide, N-octyl maleimide, N-dodecyl maleimide, N-cyclohexyl maleimide, N-phenyl maleimide, N-2-methyl maleimide, N-2,3-dimethyl phenyl maleimide, N-2,4-dimethyl phenyl maleimide, N-2,3-diethyl phenyl maleimide, N-2,4-diethyl phenyl maleimide, N-2,3-dibutyl phenyl maleimide, N-2,4-dibutyl phenyl maleimide, N-2,6-dimethyl phenyl maleimide, N-2,3-dichlorophenyl maleimide, N-2,4-dichlorophenyl maleimide, N-2,3-dibromophenyl maleimide or N-2,4-dibromophenyl maleimide, etc. Among these, N-phenyl maleimide is preferred.

Furthermore, the copolymerizable vinyl monomer (i-3) may also be other ethylenic vinyl monomer, such as, acrylic acid, methacrylic acid, maleic anhydride, methyl maleic anhydride, fumaric acid, itaconic acid and their ester (for example, dimethyl fumarate, dibutyl itaconate), ethylene, propylene, 1-butylene, 1-pentene, 4-methyl-1-pentene, ethylene chloride, vinylidene chloride, tetrafluoroethylene, chlorotrifluoroethylene, hexafluoropropylene, butadiene, propenyl amine, iso-butenyl amine, vinyl acetate, ethyl vinyl ether, methyl vinyl ketone, triallyl isocyanate, etc.

The amount of the copolymerizable vinyl monomer (i-3) in the present invention is 0–40 parts by weight, preferably 2–40 parts by weight, and most preferably 3–38 parts by weight. Among these copolymerizable vinyl monomer (i-3), ester of acrylic acid, ester of methacrylic acid or monofunctional maleimide monomer is preferred.

The polyfunctional maleimide monomer used in the present invention means that the monomer contains at least 2 functional group of maleimide, for example, 2, 3, or 4 functional groups of maleimide, wherein bismaleimide monomer is preferred. The structure of said bismaleimide is as follows:

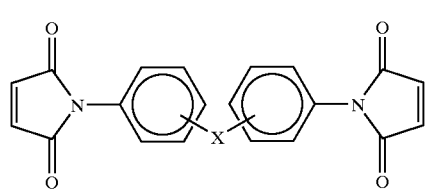

Formula(1)

[wherein, X is alkylene of 1–10 carbon atoms, arylene, carbonyl group, —SO$_2$—, —SO—, —O—, —O—R—O— (R may be alkylene or arylene)]

Examples of bismaleimide are N,N'-4,4'-(3,3'-dimethyl diphenyl methane) bismaleimide, N,N'-4,4'-(3,3'-diethyl diphenyl methane) bismaleimide, N,N'-4,4'-diphenyl methane bismaleimide, N,N'-4,4'-2,2'-diphenyl propane bismaleimide, N,N'-4,4'-diphenyl ether bismaleimide, N,N'-3,3'-diphenyl sulfone bismaleimide, N,N'-4,4'-diphenyl sulfone bismaleimide, N,N'-4,4'-diphenyl sulfoxide bismaleimide, N,N'-4,4'-benzophenone bismaleimide, N,N'-1,3'-phenylene dimaleimide, wherein, N,N'-4,4'-diphenyl methane bismaleimide and N,N'-1,3-phenylene dimaleimide are preferred.

The amount of polyfunctional maleimide used in the present invention is 0.0005–1.0 parts by weight, preferably 0.001–0.3 parts by weight, most preferably 0.003–0.1 parts by weight.

The thermoplastic styrenic resin composition of the present invention comprises styrenic copolymer (A) which is comprising 15–100 parts by weight of a unit derived from a styrene monomer (i-1), 0–45 parts by weight of a unit derived from a vinyl cyanide monomer (i-2), 0–40 parts by weight of a unit derived from a copolymerizable vinyl monomer (i-3) other than the above monomer, and 0.0005–1.0 parts by weight of a unit derived from a polyfunctional maleimide monomer, all based on 100 parts by weight of the total amount of (i-1) to (i-3). When the amount of unit derived from a polyfunctional maleimide monomer in the styrenic copolymer (A) is greater than 0.0005 parts by weight, the thermoplastic styrenic resin composition is excellent in maximum extension stress during forming process. When the amount of unit derived from a polyfunctional maleimide monomer is less than 1.0 part by weight, the thermoplastic styrenic resin composition is excellent in fluidity and color.

In the thermoplastic styrenic resin composition of the present invention, the amount of residual polyfunctional maleimide monomer is less than 100 ppm, preferably less than 60 ppm, most preferably less than 30 ppm. It is the best to get the thermoplastic styrenic resin composition without any residual polyfunctional maleimide monomer. For the analysis of residual monomer, the thermoplastic styrenic resin composition should be dissolved in THF, the solution is then analyzed by 6890A Gas Chromatography with flame ionization detector manufactured from Hewlett Packard company. The obtained value is in the unit of PPM, which is based on 100 weight % of the thermoplastic styrenic resin composition.

In the thermoplastic styrenic resin composition of the present invention, if the amount of residual polyfunctional maleimide monomer is less than 100 ppm, a better color will be obtained.

In the styrenic copolymer (A) of the present invention, the ratio of MZ (Z-average molecular weight)/Mw (weight-average molecular weight) is in the range of 2–8, preferably 2.5–7, most preferably 3–6. It is analyzed by gel permeation chromatography (GPC) manufactured from Waters Company with differential refractometer detection and light scattering detection. When the ratio of MZ/MW of styrenic copolymer (A) is between 2 and 8, the thermoplastic styrenic resin composition or the rubber modified thermoplastic styrenic resin composition is excellent in fluidity, maximum extension stress and color.

In the thermoplastic styrenic resin composition of the present invention, the $$gM = \frac{(r^2)_b}{(r^2)_l}$$ formula (2)

branching ratio (gM) is in the range of 0.45–0.95, which could be calculated according to following equation:

$(r^2)_b$: the rotating radius of branching molecule $(r^2)_l$: the rotating radius of linear molecule The analysis of branching ratio (gM) could be analyzed by a combination of GPC and Minidawn type MALLS. The GPC is manufactured by Waters Company and the Minidawn type Multi-angle Laser Light Scattering (MALLS) is manufactured by Wyatt Technology Corporation, to obtain the rotating radius of branching molecule and linear molecule at a molar mass of 1×10$^6$ g/mole, and then it can be calculated according to the above-mentioned equation.

Branching ratio is an index representing branching structure of the polymer. For the polymer with the same molecular weight, the smaller the value of the branching ratio is, the higher branching structure it will be. The desired gM can be obtained by adjusting the dosage of polyfunctional maleimide monomer. If the amount of maleimide monomer used is controlled in the range suggested in the present invention, the gM will be easily achieved.

In this thermoplastic styrenic resin composition of the present invention, the branching ratio (gM) is in the range of 0.45–0.95, preferably 0.5–0.9, most preferably 0.6–0.8. When the gM value is in the range of 0.45–0.95, the thermoplastic styrenic resin composition has better fluidity, maximum extension stress and color.

Generally, the styrenic copolymer (A) could be prepared by continuous bulk or solution polymerization, emulsion polymerization or suspension polymerization. Among these, continuous bulk or solution polymerization is especially better. The reactor for the above-mentioned polymerization may be plug flow reactor (PFR), continuous stirred tank reactor (CSTR) or static mixer reactor, etc. Among these, the CSTR is preferred. The reactors used could be only one kind of the above or a combination of the above. The number of reactors used can be 1, 2, 3, or greater than 3. When more than 2 reactors are used, the final reactor is better to be PFR. During preparation of the styrenic copolymer (A) of the present invention, the raw material solution is continuously introduced into the reactor for polymerization. It is better to add the initiator during polymerization.

In the preparation of the styrenic copolymer (A) of the present invention, the amount of the initiator is in the range of 0–1 parts by weight, preferably 0.001–0.5 parts by weight. Examples of the initiator used in the present invention are monofunctional and polyfunctional initiators. Examples of the monofunctional initiator are benzoyl peroxide, dicumyl peroxide, t-butyl peroxide, t-butyl hydroperoxide, cumene hydroperoxide, t-butyl-peroxy benzoate, bis-2-ethylhexyl peroxy dicarbonate, tert-butyl peroxy isopropyl carbonate (hereinafter abbreviated as BPIC), cyclohexanone peroxy, 2,2'-azo-bis-isobutyronitrile, 1,1'-azo-bis-(cyclohexane-1-carbonitrile, 2,2'-azo-bis-2-methyl butyronitrile, etc. Among these, benzoyl peroxide and dicumyl peroxide are preferred.

Examples of the polyfunctional initiator are 1,1-bis-(t-butyl peroxy)cyclohexane, (hereinafter abbreviated as TX-22), 1,1'-bis-(t-butylperoxy)-3,3,5-trimethyl cyclohexane, (hereinafter abbreviated as TX-29A), 2,5-dimethyl-2,5-bis-(2-ethylhexanoxy peroxy)hexane. 4-(t-butyl peroxy carbonyl)-3-hexyl-6-[7-(t-butyl peroxy carbonyl) heptyl] cyclohexane, di-t-butyl-diperoxyazelate, 2,5-dimethyl-2,5-bis-(benzoyl peroxy) hexane, di-t-butyl peroxy-hexahydro-terephthalate(hereinafter abbreviated as BPHTH), 2,2-bis-(4,4-di-t-butyl peroxy)cyclohexyl propane, polyfunctional monoperoxycarbonate (for example, Luperox JWE made by ATOFINA in America). Among these, TX-29A or BPHTP is preferred.

The polymerization temperature is controlled in the range of 20–300° C., preferably 60–250° C., and most preferably 80–200° C. The polymerization pressure of the reactor is controlled in the range of 1–10 kg/cm$^2$. The residence time of raw material solution in reactors is usually in the range of 0.5–15 hours, preferably 1–10 hours. In the present invention, chain transfer agents could be used to control molecular weight, which amount is usually in the range of 0–2 parts by weight, preferably 0.001–1 parts by weight. The chain transfer agent can be monofunctional or polyfunctional chain transfer agent. Examples of monofunctional chain transfer agent are:

1. mercaptan: methyl mercaptan, n-butyl mercaptan, cyclohexyl mercaptan, n-dodecyl mercaptan, stearyl mercaptan (hereinafter abbreviated as TDM), n-propyl mercaptan, n-octyl mercaptan, t-octyl mercaptan, t-nonyl mercaptan, etc.
2. alkyl amine: monoethylamine, dimethylamine, triethylamine, isopropylamine, diisopropylamine, butylamine, di-n-butylamine, tri-n-butylamine, etc.
3. others: pentaphenylethane, α-methyl styrene dimmer, terpinolene.

Among these, n-dodecyl mercaptan and t-dodecyl mercaptan are preferred.

Examples of polyfunctional chain transfer agent are pentaerythritol tetrakis (3-mercapto propionate), pentaerythritol tetrakis (2-mercapto acetate), trimethylolpropane tris (2-mercapto acetate), trimethylolpropane tris (3-mercapto propionate)(hereinafter abbreviated as TMPT), trimethylolpropane tris (6-mercapto hexanate), etc. Among these, trimethylolpropane tris (3-mercapto propionate) is preferred.

The styrenic copolymer (A) of the present invention is prepared by continuous introduction of raw material solution into the reactor for polymerization. When the monomers in the raw material solution attain the desired conversions, the polymer solution is then continuously introduced into devolatilization equipment for removing of unreacted monomers and other volatiles. Usually, the devolatilization equipment used could be reduced pressure devolatilization tank or extrusion devolatilization equipment. The unreacted monomers and volatiles could be recovered in condenser, which could be reused as raw material solution after dehydration, if necessary.

For the preparation of the styrenic monomer (A) of the present invention, the raw material solution comprising 15–100 parts by weight of the styrenic monomer (i-1), 0–45 parts by weight of the vinyl cyanide monomer (i-2), 0–40 parts by weight of the copolymerizable vinyl monomer (i-3), 0.0005–1.0 parts by weight of the polyfunctional maleimide monomer, and 0–60 parts by weight of solvent is used, all based on 100 parts by weight of the total amount of (i-1) to (i-3). Among these, the amount of styrenic monomer (i-1) is preferably 20–95 parts by weight, most preferably 25–90 parts by weight. The amount of vinyl cyanide (i-2) is preferably 2–40 parts by weight, most preferably 3–38 parts by weight. The amount of polyfunctional maleimide is preferably 0.001–0.3 parts by weight, most preferably 0.003–0.1 parts by weight.

In the raw material solution used of the present invention, examples of the styrenic monomer, vinyl cyanide monomer, copolymerizable vinyl monomer, and polyfunctional maleimide monomer are described the same as mentioned above, which will not be repeated here. Wherein, the copolymerizable vinyl monomer is preferably selected from ester of acrylic acid, ester of methacrylic acid and monofunctional maleimide monomer, and the amount of the copolymerizable vinyl monomer is 0–40 parts by weight, preferably 2–40 weight parts, most preferably 3–38 parts by weight.

Examples of the solvent used for raw material solution are benzene, toluene, ethylbenzene, p-dimethylbenzene, o-dimethylbenzene, m-dimethylbenzene, pentane, octane, cyclohexane, methyl ethyl ketone, acetone, methyl butyl ketone, etc.

In the present invention, the styrenic copolymer (A) used as the continuous phase and rubber particle (B) used as the dispersed phase form the rubber modified thermoplastic styrenic resin composition, in which the rubber content is in the range of 1–40 weight %, preferably 3–35 weight %.

The rubber modified thermoplastic styrenic resin composition can also be manufactured by addition of rubber into raw material solution during the polymerization of the styrenic copolymer (A) (hereinafter referred to as simultaneous grafting method) or by blending and extrusion of the rubber (for example, rubber or rubber graft copolymer, wherein rubber graft copolymer is preferred) with the styrenic copolymer (A) of the present invention (hereinafter referred to as mixing method). The simultaneous grafting method could usually be conducted by bulk polymerization, solution polymerization, emulsion polymerization or suspension polymerization. The rubber graft copolymer could usually be obtained by emulsion polymerization or emulsion-bulk polymerization; especially emulsion polymerization is preferred.

In the rubber modified thermoplastic styrenic resin composition of the present invention, the weight-average diameter of rubber particle (B) is usually in the range of 0.05–10 μm, preferably 0.1–5 μm, most preferably 0.1–1 μm.

The preparation of rubber modified thermoplastic styrenic resin composition of the present invention is described as following:

Method 1: Simultaneous Grafting Method

Method 1 could be used to manufacture rubber modified thermoplastic styrenic resin composition. It is preferable to use continuous bulk or solution polymerization for Method 1. The reactors used in Method 1 include plug flow reactor (PFR), continuous stirred tank reactor (CSTR), static mixer reactor, etc., wherein CSTR is preferred. The reactors used could be single or a combination of two or more. If two or more reactors are used, the final reactor is preferably PFR. The raw material solution required for the rubber modified thermoplastic styrenic resin composition (containing rubber) is continuously introduced into the reactor for polymerization at first. The polymerization temperature is controlled between 30–300° C., preferably 60–250° C., most preferably 80–200° C. Polymerization pressure is controlled between 1–10 kg/cm². The residence time in the reactor is 0.5–15 hours, preferably 1–10 hours. For the controlling of molecular weight, initiators and chain transfer agents can be used in the preparation of rubber modified thermoplastic styrenic resin composition, if necessary.

The rubber modified thermoplastic styrenic resin composition is prepared by continuously introducing the raw material solution into the reactor for polymerization. When all the monomers in the raw material solution attain desired conversions, the polymer solution is then continuously introduced into devolatilization equipment for removing of unreacted monomers and other volatiles. Usually, the devolatilization equipment used can be reduced pressure devolatilization tank or extrusion devolatilization equipment. The unreacted monomers and volatiles could be recovered in condenser, which could be reused as raw material solution after dehydration, if necessary.

For the preparation of the rubber modified thermoplastic styrenic resin composition of the present invention, the raw material solution in bulk or solution polymerization comprises 15–100 parts by weight of the styrenic monomer (i-1), 0–45 parts by weight of the vinyl cyanide monomer (i-2), 0–40 parts by weight of the copolymerizable vinyl monomer (i-3) other than the above monomer, 0.0005–1.0 parts by weight of the polyfunctional maleimide monomer, 0–60 parts by weight of the solvent and 0.5–25 parts by weight of the rubber, all based on 100 parts by weight of the total amount of (i-1) to (i-3). Among these, the styrenic monomer, vinyl cyanide monomer, copolymerizable vinyl monomer, solvent, and optionally initiator or chains transfer agent are described the same as above-mentioned, so they are not repeated here.

In Method 1, the rubber modified thermoplastic styrenic resin composition may also be prepared by emulsion polymerization, which is similar to the preparation of the rubber graft copolymer (B') which will be mentioned later except that 0.0005~1.0 wt % (based on 100 wt % monomer mixture) of polyfunctional maleimide monomer is additionally added.

In the initial stage of the bulk or solution polymerization for the rubber modified thermoplastic styrenic resin composition, the raw material solution contains rubber, styrenic monomer, vinyl cyanide monomer, etc., wherein the rubber phase exists in a continuous phase. The conversion of the monomers such as styrenic monomer, vinyl cyanide monomer, etc., is increased gradually along with graft polymerization. Under the action of stirring and higher conversion, the rubber will be gradually surrounded by styrenic monomer, vinyl cyanide monomer and polymer which is polymerized from above monomers, etc., and as a result the rubber phase is converted into separated particle (dispersed phase). In another respect the mixture of styrenic monomer, vinyl cyanide monomer, etc., and their polymer, which originally exist in discontinuous phase, is converted into continuous phase. Finally, the rubber particle phase is formed. The weight-average diameter of rubber particle is in the range of 0.05–10 μm, preferably 0.1–5 μm, most preferably 0.1–1 μm.

Examples of the rubber used in Method 1 are diene rubber, polyolefin rubber (for example, ethylene-propylene rubber), polyacrylate rubber, polysiloxane rubber and others. The diene rubber is the polymer which is polymerized from diene monomer, and the glass temperature is less than 0° C. Examples of the diene rubber are butadiene rubber, isoprene rubber, chlorobutadiene rubber, EPDM rubber, styrene-diene rubber, acrylonitrile-diene rubber. Among these, the butadiene rubber includes Hi-Cis content butadiene rubber and Low-Cis content butadiene rubber. In Hi-Cis content butadiene rubber, the typical ratio of Cis/vinyl by weight is (94–99%)/(0–5%), and the other is Trans Structure. The Mooney viscosity is in the range of 20–120 and the molecular weight is in the range of 100000–800000. In Low-Cis content butadiene rubber, the typical ratio of Cis/vinyl by weight is in the range of (20–40%)/(6–20%), and the other is Trans Structure. The Mooney viscosity is in the range of 20–120 and the molecular weight is in the range of 100000–800000. Styrene-diene rubber includes styrene-butadiene rubber, Styrene-isoprene rubber, etc., which could be random copolymer or taper copolymer, in which, the styrene content in the styrene-butadiene rubber is less than 50 weight % and the molecular weight is 50000–600000. Among these, the butadiene rubber and styrene-butadiene rubber is preferred.

Method 2: Mixing Method

According to Method 2, the rubber modified thermoplastic styrenic resin composition of the present invention could be prepared by mixing of styrenic copolymer (A) with rubber graft copolymer (B') and then the above mixture is extruded.

Method 2 could be conducted by dry-mixing of styrenic copolymer (A) with rubber graft copolymer (B') in an conventional Henschel mixer and then the above mixture is extruded by extruder such as single, twin-screw extruder, Banbury mixer and Brabender plasticator. After extrusion, the resulting resin is cooled and palletized.

Rubber graft copolymer (B') could be prepared by bulk or solution polymerization, emulsion polymerization or suspension polymerization. In the preparation by bulk or solution polymerization, the rubber graft copolymer (B') will be obtained by the graft polymerization of the raw material solution, which contains 15–100 parts by weight of the styrenic monomer (i-1), 0–45 parts by weight of the vinyl cyanide monomer (i-2), 0–40 parts by weight of the copolymerizable vinyl monomer (i-3), 0–60 parts by weight of the solvent and 0.5–2.5 parts by weight of the rubber, all based on 100 parts by weight of the total amount of (i-1) to (i-3). Usually the raw material solution contains no polyfunctional maleimide monomer. If polyfunctional maleimide is used, the amount of the polyfunctional maleimide should be below the lower limit stipulated in the present invention. The examples of the rubber are similar to that described in Method 1.

In the initial stage of the bulk or solution polymerization for the rubber graft copolymer (B'), the raw material solution contains styrenic monomer, vinyl cyanide monomer and rubber, etc., and the rubber phase exists in a continuous phase. The conversion of the monomers such as styrenic monomer, vinyl cyanide monomer, etc., is increased gradually along with graft polymerization. Under the action of stirring and higher conversion, the rubber will be gradually surrounded by styrenic monomer, vinyl cyanide monomer and polymer which is polymerized from above monomers, etc., and as a result the rubber phase is converted into separated particle (dispersed phase). In another respect, the mixture of styrenic monomer, vinyl cyanide monomer, etc., and their polymer which originally exist in discontinuous phase is converted into continuous phase. Finally, the rubber particle phase is formed. The weight-average diameter of rubber particle is in the range of 0.05–10 μm, preferably, 0.1–5 μm most preferably 0.1–1 μm.

The preparation of rubber graft copolymer (B') could also be conducted by emulsion polymerization which contains a mixture of 40–90 parts by weight of the rubber latex (solid content) and 60–10 parts by weight of the monomer mixture comprising styrenic monomer 15–100 weight %, vinyl cyanide monomer 0–45 weight %, and the other copolymerizable vinyl monomer 0–40 weight %. The initiator and chain transfer agent can also be added during emulsion polymerization, if necessary. The above mixture is polymerized to form rubber graft copolymer emulsion at first, then the rubber graft copolymer emulsion is coagulated, dehydrated, and dried to produce the rubber graft copolymer (B') required in the present invention.

The composition of the rubber latex is similar to that described in Method 1, wherein, the diene rubber is preferred. The diene rubber latex could be prepared by emulsion polymerization from diene monomer (for example, butadiene) or 100–50 parts by weight of the diene monomer with 0–50 parts by weight of the other copolymerizable vinyl monomers such as styrene, acrylonitrile, ester of (meth)acrylic acid. The weight-average diameter of rubber particle is in the range of 0.05–0.6 μm. The diene rubber latex could also be prepared by emulsion polymerization from the above monomers, with rubber particle size of weight-average diameter of 0.05–0.2 μm, firstly. Then, the diene rubber latex is agglomerated to enlarge the rubber particle size having a weight average diameter of 0.22–0.6 μm by a conventional rubber agglomerating method. Examples of the rubber agglomerating method are freezing agglomerating, a mechanical stirring agglomerating and a chemical agglomerating method. The chemical agglomerating method is achieved by adding an additive such as acetic anhydride, hydrogen chloride, sulfuric acid, sodium chloride, potassium chloride, calcium chloride, (meth) acrylic acid—meth)acrylate copolymer (for example, methacrylic acid—butyl acrylate copolymer, methacrylic acid-ethyl acrylate copolymer) and other polymeric agglomerating agent containing a carboxylic group.

In the present invention, the rubber content of the rubber modified thermoplastic styrenic resin composition is in the range of 1–40 weight %, preferably 4–35 weight %, most preferably 6–30 weight %. When the rubber content is in the range of 1–40 weight %, the rubber modified thermoplastic styrenic resin composition is excellent in impact strength, fluidity and other mechanical properties.

In the rubber modified thermoplastic styrenic resin composition of the present invention, the residual polyfunctional maleimide monomer is less than 100 ppm, preferably below 60 ppm, most preferably below 30 ppm. It is the best to get the rubber modified thermoplastic styrenic resin composition without any residual polyfunctional maleimide monomer. If the residual polyfunctional maleimide monomer is less than 100 ppm, the rubber modified thermoplastic styrenic resin composition is excellent in heat stability and contaminations can be improved.

The branching ratio (gM) of the rubber modified thermoplastic styrenic resin composition in this present invention is in the range of 0.45–0.95, preferably 0.5–0.9, most preferably 0.6–0.8. If the branching ratio (gM) is in the range of 0.45–0.95, the rubber modified thermoplastic styrenic resin composition is excellent in fluidity and color. The analysis of gM is similar to that described above. But the rubber particle of dispersed phase should be removed from the rubber modified thermoplastic styrenic resin composition before analysis. For example, when determining the gM of rubber modified thermoplastic styrenic resin composition prepared with simultaneous grafting, the solvent, such as methyl ethyl ketone which can dissolve styrenic copolymer (A) but can not dissolve the rubber particle, should be selected at first. After that, the rubber particle could be removed by filtration. The solvent could then be evaporated to obtain the ingredient without rubber particle for analysis. Furthermore, when the rubber modified thermoplastic styrenic resin composition is determined for MZ or MW, the styrenic copolymer (A) which contains no rubber particle is also required.

In the rubber modified thermoplastic styrenic resin composition of the present invention, the amount of unit derived from a polyfunctional maleimide monomer in styrenic copolymer (A) is in the range of 0.0005–1.0 parts by weight, preferably 0.001–0.3 parts by weight, most preferably 0.003–0.1 parts by weight. When the amount of unit derived from a polyfunctional maleimide monomer in styrenic copolymer (A) is great than 0.0005 parts by weight, the rubber modified thermoplastic styrenic resin composition, especially used as the raw material of thermoplastic processing, is excellent in thickness uniformity after vacuum forming process and the gloss on the surface of injected products after painting process is also good. When the amount of unit derived from a polyfunctional maleimide monomer in styrenic copolymer (A) is less than 1.0 parts by weight, the rubber modified thermoplastic styrenic resin composition, especially used as the raw material of thermoplastic processing is excellent in heat stability, and the contaminations can be improved, and the gloss on the surface of injected products after painting process is also good. In addition, the polymer is excellent in fluidity and the continuous polymerization could be proceeded smoothly.

The thermoplastic styrenic resin composition or the rubber modified thermoplastic styrenic resin composition in this present invention, if necessary, could be added with various types of additives such as anti-oxidant, lubricant, UV-absorbent, UV-stabilizer, anti-static agent, colorant, etc. The additives could be added during the period of polymerization of styrenic copolymer (A) or extrusion of the thermoplastic styrenic resin composition. The amount of additives is less than 6 parts by weight, based on 100 parts by weight of the thermoplastic styrenic resin composition. Other additives such as fire retardant, impact modifier, etc. could also be used, if necessary. The amount of other additives is less than 30 parts by weight, based on 100 parts by weight of the thermoplastic styrenic resin composition.

If necessary, the thermoplastic styrenic resin composition or rubber modified thermoplastic styrenic resin composition of the present invention could be mixed with the resin other than thermoplastic styrenic copolymer (A). Examples of the resin are acrylonitrile-butadiene-styrene resin, styrene-acrylonitrile resin, acrylonitrile-butadiene-α-methylstyrene resin, acrylonitrile-styrene-methyl methacrylate resin, acrylonitrile-styrene-N-phenyl maleimide resin, styrene-maleic anhydride resin, styrene-N-phenyl maleimide resin, poly methyl methacrylate, polycarbonate resin, styrene-methacrylate resin, methacrylate-butadiene-styrene resin, polyamide resin, polyester resin, polyphenylene oxide resin, acrylonitrile-acrylate rubber-styrene resin, acrylonitrile-(ethylene-propylene rubber)-styrene resin, and acrylonitrile-silicon rubber-styrene resin, etc. They may be used either singly or in combination. The amount of the above resin is less than 80 parts by weight, based on 100 parts by weight of the thermoplastic styrenic resin composition or rubber modified thermoplastic styrenic resin composition.

EXAMPLE 1

Preparation of Styrenic Copolymer (A-1)

A mixture of 68 parts by weight of the styrene monomer, 32 parts by weight of the acrylonitrile, 0.02 parts by weight of the N,N'-4,4'-diphenyl methane bismaleimide, 20 parts by weight of the ethylbenzene, 0.02 parts by weight of the initiator benzoyl peroxide and 0.2 parts by weight of the chain transfer agent t-dodecyl mercaptan are prepared and then are continuously charged to two continuous stirred tank reactors in series, the volumes of reactors are 40 liters and 70 liters respectively. The temperature of these two reactors are controlled at 100° C. and 120° C. respectively under the same pressure of 4 kg/cm². The total residence time in reactors is set for 2 hours with the conversions in two reactors of 30 weight % and 50 weight %, respectively. After polymerization, the copolymer solution is introduced into devolatilization equipment for removing of unreacted monomers and other volatiles. Usually, the devolatilization equipment could be used including reduced pressure devolatilization tank or extrusion devolatilization equipment. Then the melted polymer is extruded. After extrusion, the resulting resin is cooled and palletized, and the styrenic copolymer (A-1) of the present invention is obtained. The preparation of the styrenic copolymer (A-1) and physical properties are shown in Table 1.

EXAMPLE 2

Preparation of Styrenic Copolymer (A-2)

The procedures of Example 1 is repeated except that the amount of N,N'-4,4'-diphenyl methane bismaleimide is changed to 0.01 parts by weight, and the preparation and physical properties of the styrenic copolymer (A-2) are shown in Table 1.

EXAMPLE 3

Preparation of Styrenic Copolymer (A-3)

The procedures of Example 1 is repeated except that the amount of monomers and initiators are changed. That is, 58 parts by weight of the styrene monomer, 22 parts by weight of the acrylonitrile, 0.01 parts by weight of the N,N'-4,4'-diphenyl methane bismaleimide and 20 parts by weight of the N-phenyl maleimide, and the initiator 0.015 parts by weight of the benzoyl peroxide and 0.005 parts by weight of the TX-29A are used. The preparation of the styrenic copolymer (A-3) and physical properties are shown in Table 1.

EXAMPLE 4

Preparation of Styrenic Copolymer (A-4)

A mixture of 100 parts by weight of the styrene monomer, 0.02 parts by weight of the N,N'-4,4'-diphenyl methane bismaleimide, 8 parts by weight of the ethylbenzene, 0.02 part by weight of the initiator benzoyl peroxide, 0.02 part by weight of the chain transfer agent t-dodecyl mercaptan are prepared and then are continuously charged to three plug flow reactors in series, which have a same volume of 100 liters and are controlled at 110° C., 130° C. and 160° C. respectively with a same pressure of 3 kg/cm², the total residence time in reactors is set for 7 hours, the conversion of monomers in 3 reactors are kept at 30 weight %, 60 weight %, 85 weight % respectively. After polymerization, the copolymer solution is usually introduced into devolatilization equipment for removing of unreacted monomers and other volatiles. Usually, the devolatilization equipment could be used including reduced pressure devolatilization tank or extrusion devolatilization equipment. Then the melted polymer is extruded. After extrusion, the resulting resin is cooled and palletized, and the styrenic copolymer (A-4) of the present invention is obtained. The preparation of the styrenic copolymer (A-4) and physical properties are shown in Table 1.

COMPARATIVE EXAMPLE 1

Preparation of Styrenic Copolymer (A-5)

The procedure of Example 1 is repeated except that N,N'-4,4'-diphenyl methane bismaleimide monomer is not used, the preparation and physical properties of the styrenic copolymer (A-5) are shown in Table 1.

COMPARATIVE EXAMPLE 2

Preparation of Styrenic Copolymer (A-5)

The procedure of Example 1 is repeated except that the amount of N,N'-4,4'-diphenyl methane bismaleimide is changed to 1.5 parts by weight, during polymerization, the viscosity of the reaction system is increased sharply, the color of the product is bad and the contaminations are increased, the reaction could not be continued at last.

EXAMPLE 5

Preparation of Rubber Modified Thermoplastic Styrenic Resin Composition (A-5)

A mixture of 74 parts by weight of the styrene monomer, 26 parts by weight of the acrylonitrile, 12 parts by weight of the butadiene rubber, 0.02 part by weight of the N,N'-4,4'-diphenyl methane bismaleimide, 20 parts by weight of the ethylbenzene, 0.05 part by weight of the initiator benzoyl peroxide, and 0.3 part by weight of the chain transfer agent t-dodecyl mercaptan are prepared and then are continuously introduced into four continuous stirred tank reactors in series, which are the same volume of 45 liters. The polymerization temperature are controlled at 95° C., 100° C. and 110° C. and 120° C., respectively, with the pressure of 4.5 kg/cm², 4 kg/cm², 4 kg/cm² and 4 kg/cm², respectively. The total residence time in reactors is set for 4 hours. The monomer conversion in 4 reactors is kept at 22 weight %, 31 weight %, 45 weight % and 52 weight %, respectively.

After polymerization, the copolymer solution is usually introduced into devolatilization equipment for removing of unreacted monomers and other volatiles. Usually, the devolatilization equipment could be used including reduced pressure devolatilization tank or extrusion devolatilization equipment. Then the melted polymer is extruded, after extrusion, the resulting resin is cooled and palletized, and the rubber modified thermoplastic styrenic copolymer (C-1) of the present invention is obtained. The rubber modified thermoplastic styrenic copolymer (C-1) comprises styrene copolymer (A) as the continuous phase, which containing units of styrene monomer, vinyl cyanide, etc. and rubber particle (B) as the dispersed phase. The weight-average diameter of rubber particle (B) is 0.81 μm. The preparation of the rubber modified styrenic resin composition (C-1) and physical properties are shown in Table 2.

COMPARATIVE EXAMPLE 3

Preparation of Rubber Modified Thermoplastic Styrenic Resin Composition (C-2)

The procedure of Example 5 is repeated except that N,N'-4,4'-diphenyl methane bismaleimide monomer is not used. The weight-average diameter of rubber particle (B) is 0.81 μm. The preparation and physical properties of the rubber modified thermoplastic styrenic resin composition (C-2) are shown in Table 2.

COMPARATIVE EXAMPLE 4

Preparation of Rubber Modified Thermoplastic Styrenic Resin Composition (C-3)

The procedure of Example 5 is repeated except that 0.02 parts by weight of N,N'-4,4'-diphenyl methane bismaleimide monomer is replaced with 0.02 parts by weight of PGDA (Neopentyl glycol diacrylate). The preparation and physical properties of the rubber modified thermoplastic styrenic resin composition (C-3) are shown in Table 2.

REFERENCE EXAMPLE 1

Preparation of Rubber Graft Copolymer (B'-1)

A mixture of 72 parts by weight of the styrene monomer, 28 parts by weight of the acrylonitrile, 20 parts by weight of the ethylbenzene, 6.5 parts by weight of the butadiene rubber, 0.05 part by weight of the initiator benzoyl peroxide, and 0.3 part by weight of the chain transfer agent t-dodecyl mercaptan is prepared and then is continuously introduced into four continuous stirred tank reactors in series, which are the same volume of 45 liters. The polymerization temperature in the four reactors are controlled at 90° C., 100° C., 110° C., and 120° C. respectively with a same pressure of 4 kg/cm², the monomer conversions in the four reactors are controlled at 23 weight %, 35 weight %, 42 weight %, and 51 weight % respectively.

After polymerization, the copolymer solution is introduced into devolatilization equipment for removing of unreacted monomers and other volatiles. Usually, the devolatilization equipment could be used including reduced pressure devolatilization tank or extrusion devolatilization equipment. Then the melted polymer is extruded. After extrusion, the resulting resin is cooled and palletized, and rubber graft copolymer (B'-1) is obtained. In the rubber graft copolymer (B'-1) of the present invention, the rubber content is 10 weight % and the weight-average diameter is 0.79 μm.

REFERENCE EXAMPLE 2

Preparation of Rubber Graft Copolymer (B'-2)

TABLE 3

| Composition | Parts by weight |
|---|---|
| 1,3-butadiene | 150.0 |
| Potassium Persulfate Solution (1%) | 15.0 |
| Potassium Oleate | 2.0 |
| Distilled Water | 190.0 |
| Ethylene Glycol dimethacrylate | 0.13 |

A mixture based on the recipe given in Table 3 is polymerized at 65° C. for 14 hours, and the rubber latex can be obtained. The conversion is 94%, solid content is about 36 wt % and weight-average diameter of the rubber particle is 0.1 μm.

In addition, a polymeric agglomerating agent containing a carboxylic group, is prepared in accordance with the recipe in Table 4.

TABLE 4

| Composition | Parts by weight |
|---|---|
| Butyl acrylate | 90.0 |
| Methacrylic acid | 10.0 |
| Potassium Persulfate Solution (1%) | 0.5 |
| Sodium dodecyl sulfate (10%) | 0.5 |
| n-dodecyl Mercaptan | 1.0 |
| Distilled Water | 200.0 |

A mixture based on the recipe given in Table 4 is polymerized at 75° C. for 5 hours, and the agglomerating agent can be obtained. The conversion is 95% and the pH value is 6.0.

Then 100 parts by weight (dry) of the rubber latex are agglomerated with 3.0 parts by weight (dry) of polymeric agglomerating agent containing a carboxylic group. And an agglomerated rubber latex with a pH of 8.5 and weight average diameter of 0.31 μm can be obtained.

Finally, the agglomerated rubber latex is grafted with acrylonitrile and styrene in accordance with the recipe in Table 5 to achieve rubber graft copolymer (B'-2).

TABLE 5

| Composition | Parts by weight |
|---|---|
| agglomerated rubber latex (Dry Weight) | 100.0 |
| Styrene monomer | 75.0 |
| Acrylonitrile | 25.0 |
| t-dodecyl Mercaptan | 2.0 |
| Cumene Hydroperoxide | 3.0 |
| Ferrous Sulfate (0.2%) | 3.0 |
| Formaldehyde Sodium sulfoxylate (10%) | 0.9 |
| EDTA Solution (0.25%) | 3.0 |

The rubber graft copolymer latex prepared from the above components are coagulated with calcium chloride, dehydrated, and dried to have a moisture content of below 2%, thus the powdery rubber graft copolymer (B'-2) required in this invention could be obtained (Rubber Content of 50 weight %, weight-average diameter of 0.31 μm).

EXAMPLE 6

Preparation of Rubber Modified Thermoplastic Styrenic Resin Composition (C4)

A mixture of 20 parts by weight of the rubber graft copolymer (B'-1), 30 parts by weight of the rubber graft copolymer (B'-2), 50 parts by weight of the styrenic copolymer (A-1) and 0.3 parts by weight of the ethylene bissteara- mide (EBS) are dry-blended by using a Henschel mixer to form a mixture. The mixture is fed into a twin-screw extruder which is provided with a barrel temperature kept at 200–220° C., a die temperature kept at 220° C., and a vent hole, to produce the rubber modified thermoplastic styrenic resin composition (C-4) in pellet form. The weight-average rubber particle diameter is 0.36 μm, and the preparation and physical properties are shown in Table 6.

EXAMPLE 7

Preparation of Rubber Modified Thermoplastic Styrenic Resin Composition (C-5)

The procedure of Example 6 is repeated except that the styrenic copolymer (A-1) is replaced by styrenic copolymer (A-3), and the temperature of the barrel and die of the extruder are controlled at 220–240° C. and 240° C., respectively. The preparation of the thermoplastic styrenic resin composition (C-5) and physical properties are shown in Table 6.

EXAMPLE 8

Preparation of Rubber Modified Thermoplastic Styrenic Resin Composition (C-6)

A mixture of 36 parts by weight of the rubber graft copolymer (D-2), 64 parts by weight of the styrenic copolymer (A-1) and 0.3 parts by weight of the ethylene bissteara- mide are dry-blended by using a Henschel mixer to form a mixture. The mixture is fed into a twin-screw extruder which is provided with a barrel temperature kept at 200–220° C., a die temperature kept at 220° C., and a vent hole, to produce the rubber modified thermoplastic styrenic resin composition (C-6) in pellet form. The diameter of rubber particle is 0.31 μm, and the preparation of modified thermoplastic styrenic resin composition (C-6) and physical properties are shown in Table 6.

EXAMPLE 9

Preparation of Rubber Modified Thermoplastic Styrenic Resin Composition (C-7)

The procedure of Example 8 is repeated except that the styrenic copolymer (A-1) is replaced by styrenic copolymer (A-3), and the temperature of the barrel and die of the extruder are controlled at 220–240° C. and 240° C., respectively. The preparation of the rubber modified thermoplastic styrenic resin composition (C-7) and physical properties are shown in Table 6.

EXAMPLE 5

Preparation of Rubber Modified Thermoplastic Styrenic Resin Composition (C-8)

The procedure of Example 6 is repeated except that the styrenic copolymer (A-1) is replaced by styrenic copolymer (A-6), and the preparation of thermoplastic styrenic resin composition (C-8) and physical properties are shown in Table 6.

COMPARATIVE EXAMPLE 6

Preparation of Rubber Modified Thermoplastic Styrenic Resin Composition (C-9)

The procedure of Example 8 is repeated except that the styrenic copolymer (A-1) is replaced by styrenic copolymer (A-6), and the preparation of the rubber modified thermoplastic styrenic resin composition (C-9) and physical properties are shown in Table 6.

The standards of analysis for all the physical propertied of the practice examples and comparative examples in this invention are as follows:

1. Composition of Thermoplastic Styrenic Resin Composition

It is analyzed with Fourier Transform Infrared Spectrometer manufactured from Nicolet Company, the series No. is Nexus 470. The rubber content of thermoplastic styrenic resin composition (rubber modified thermoplastic styrenic resin composition is also included below) is in the unit of weight %. The amount of unit derived from BMI monomer is calculated by use of the mass balance of the raw materials added in the polymerization, the conversion of monomers and the composition of the recovered volatiles.

2. Residual BMI Monomer

The thermoplastic styrenic resin composition is dissolved in tetrahydrofuran and then the solution is analyzed with gas chromatograph equipped with flame ionization detector manufactured from Hewlett Packard Company, the series No. is 6890A. If the residual Bismaleimide (BMI) monomer is less than 2 ppm, it will be shown with N.D (Non Detectable).

3. MZ and MW

It is analyzed by gel permeation chromatograph (GPC) equipped with differential refractometer refraction detection and light scattering detection manufactured from Water Company. The conditions for analysis are as follow:

Column: KD-806M

Detector: Water RI-2410

Moving Phase: THF (Flow speed: 1.0 cc/min)

4. Branching Ratio (gM)

It is analyzed by use of a combination of gel permeation chromatograph (GPC)

$$gM = \frac{(r^2)_b}{(r^2)_l}$$

manufactured from Water company and a multi-angle laser light scattering(MALLS) manufactured from Wyatt Technology company, in series, to achieve the rotating radius of branching molecule and linear molecule at a molar mass of $1 \times 10^6$ g/mol, and then the branching ratio (gM) can be calculated in accordance with the following equation.

$(r^2)_b$: the rotating radius of branching molecule $(r^2)_l$: the rotating radius of linear molecule 5. MI (Melt Flow Index)

It is analyzed in accordance with ASTMD-1238 at a test temperature of 220° C. and a load of 10 kg. The value obtained is in the unit of g/10 min.

6. Maximum Extension Stress

Please referring to FIG. 1, which is used for the analysis of maximum extension stress. The instrument is heated by a heater 10. Hot nitrogen gas, which is heated by heater 10, is introduced through outlet 50, in the outside of the discharge port of capillary rheometer 20 is a pair of rollers, called the first pair of roller 30, to draw the melted resin 90. For the transportation of the melted resin 90 to outlet 50, another pair of rollers 40 is installed between the first pair of rollers 30 and the outlet 50, which is named the second pair of rollers 40. In this way, the melted resin after the first pair of roller 30 will be received by the second pair of rollers 40 and then transported to outlet 50 to avoid flowing to other locations. The first pair of rollers is equipped with a load cell to detect the drawing force (Pa), which is defined as extension stress. The analysis is operated at a shear rate of 0.1–0.5 1/sec, under 150° C., $N_2$ atmosphere. The change of melt tension of the resin is indicated as the change of extension stress. If the melt tension is increased, the extension stress can be raised.

7. Color

The color of the resin is direct analyzed with calorimeter manufactured from Nippon Denshoku, and the series No. is NDJ-300A. The dimensions of quartz cell is 5.5 cm×4.0 cm×2.4 cm.

8. Heat Stability (Δ YI)

The thermoplastic styrenic resin composition is injection-molded at a cylinder temperature of 230° C. by a injection molded machine with a capacity of 4.2 oz (117.6 g) manufactured from Zhenxiong Company. The injection-molded item is a disk with a thickness of ⅛" and a diameter of 5 cm. The disk is then heated in an oven at 200° C. for 2 hours. The yellow index (YI) before or after heating is analyzed with colorimeter manufactured from Datacolor International Company, and the series No. is Spectraflash 500.

$$\Delta YI = YI(\text{after heating}) - YI(\text{before heating})$$

9. Wall Thickness Uniformity

The thermoplastic styrenic resin composition is extruded to form a sheet of 500 mm×500 mm×2 mm by single screw extruder manufactured from Hitachi Zosen (90 mm) at a cylinder temperature of 235° C., which is introduced to a vacuum forming machine at 160° C. to produce an inner wall of refrigerator with a vacuum forming. The wall thickness of the product is analyzed at 10 different spots. The difference between the maximum and minimum is then calculated.

O: thickness uniformity is good, the difference between the maximum and minimum is less than 0.5 mm x: thickness uniformity is bad, the difference between the maximum and minimum is above 0.5 mm 10. The Gloss on the Surface of Injected Products after Painting Process The thermoplastic styrenic resin composition is molded at a cylinder temperature of 230° C. by an injection machine with a capacity of 4.2 oz (117.6 g) manufactured from Zhenxiong Company. The injection-molded item is a 15 cm×7 cm×0.3 cm plate, which is then painted with acrylic paint for gloss observation.

O: gloss is good x: gloss is bad

11. Contaminations

A film with a thickness of 0.3 mm and a diameter of 200 mm is shaped with 10 g of the above-mentioned thermoplastic styrenic resin composition by heating press and then the number of contaminations are observed.

12. Weight-Average Particle Diameter

The weight average particle diameter of rubber particle is determined by means of a relatively thin section of resin which is dyed primarily and which is then photographed by a transmission electron microscope. There are about 200–1000 dispersed rubber particles presented on the photograph, and the particle diameter is determined individually. The weight average particle diameter which is based on 200–1000 rubber particles, can be calculated through the following formula:

$$\text{Weight Average Particle Diameter} = \Sigma\, niDi^4/\Sigma\, niDi^3$$

ni=the number of the rubber particle with a diameter of Di

As shown in Table 1, the thermoplastic styrenic resin composition manufactured in the present invention is excellent in processability. The rubber modified thermoplastic styrenic resin composition of the present invention gives a good heat stability, impact strength, fluidity and other mechanical properties. In addition, it also gives a uniform wall thickness, and the gloss on the surface of injected products after painting process is excellent. All these are shown in Table 2 and Table 6. The thermoplastic styrenic resin composition and the rubber modified thermoplastic styrenic resin composition in this invention are applicable for electric and electronic articles and they are especially applicable for the forming and processing of refrigerator plates. So, the thermoplastic styrenic resin composition and the rubber modified thermoplastic styrenic resin composition of the present invention is beneficial to the industry is also commercially valuable.

It is apparent to those skill in the art that the foregoing descriptions are merely the preferred embodiments and examples. The scope of the present invention is not to be limited by the specific embodiments and examples herein disclosed. Any equivalent variations or modifications, which are performed within the spirit disclosed by the present invention, are intended to fall within the scope of the present invention.

What is claimed is:

1. A rubber modified thermoplastic styrenic resin composition comprises a styrenic copolymer (A) as the continuous phase comprising, 15–100 parts by weight of a unit derived from a styrenic monomer (i-1), 0–45 parts by weight of a unit derived from a vinyl cyanide monomer (i-2), 0–40 parts by weight of a unit derived from a copolymerizable vinyl monomer (i-3) other than the above monomer, and 0.0005–1.0 parts by weight of a unit derived from a polyfunctional maleimide monomer, all based on 100 parts by weight of the total amount of (i-1) to (i-3), and rubber particle (B) as the dispersed phase wherein the rubber content of the rubber modified thermoplastic styrenic resin composition is in the range of 1–40 weight %.

2. A rubber modified thermoplastic styrenic resin composition as claimed in claim 1, wherein the residual polyfunctional maleimide monomer is less than 100 ppm.

3. A rubber modified thermoplastic styrenic resin composition as claimed in claim 1, the $$gM = \frac{(r^2)_b}{(r^2)_l}$$

branching ratio (gM) is in the range of 0.45–0.95, wherein:

$(r^2)_b$: the rotating radius of branching molecule $(R^2)_l$: the rotating radius of linear molecule.

4. A rubber modified thermoplastic styrenic resin composition as claimed in claim 1, wherein the polyfunctional maleimide monomer is selected from bismaleimide.

* * * * *